(12) United States Patent
Saito

(10) Patent No.: US 8,794,891 B1
(45) Date of Patent: Aug. 5, 2014

(54) ROUND TOP SET SCREW AND APPLICATION THEREOF

(71) Applicant: Hirofumi Saito, Chula Vista, CA (US)

(72) Inventor: Hirofumi Saito, Chula Vista, CA (US)

( * ) Notice: Subject to any disclaimer, the term of this patent is extended or adjusted under 35 U.S.C. 154(b) by 0 days.

(21) Appl. No.: 13/941,648

(22) Filed: Jul. 15, 2013

(51) Int. Cl.
*F16B 35/00* (2006.01)
*B21D 1/14* (2006.01)
*B25B 13/48* (2006.01)

(52) U.S. Cl.
CPC ............... *F16B 35/005* (2013.01); *B21D 1/14* (2013.01); *B25B 13/48* (2013.01)
USPC ........................................... 411/393; 411/402

(58) Field of Classification Search
CPC ............... F16B 35/005; F16B 35/00
USPC ................... 411/378, 393, 402, 919
See application file for complete search history.

(56) References Cited

U.S. PATENT DOCUMENTS

| | | | | | |
|---|---|---|---|---|---|
| 172,459 | A | * | 1/1876 | Lewis | 411/378 |
| 429,057 | A | * | 5/1890 | Peterson | 248/62 |
| 446,741 | A | * | 2/1891 | Jones | 411/393 |
| 448,347 | A | * | 3/1891 | Jones | 411/393 |
| D31,894 | S | * | 11/1899 | Dixon | D8/387 |
| 755,804 | A | * | 3/1904 | Smith | 411/402 |
| 869,086 | A | * | 10/1907 | Hoffman | 411/393 |
| 907,160 | A | * | 12/1908 | Molloy | 411/393 |
| 1,762,410 | A | * | 6/1930 | Newpher | 470/27 |
| 1,934,752 | A | * | 11/1933 | Wilcox | 470/11 |
| 1,936,769 | A | * | 11/1933 | Olivet | 16/381 |
| 2,076,041 | A | * | 4/1937 | Payne | 411/410 |
| 2,153,702 | A | * | 4/1939 | Tighe | 411/378 |
| 2,246,457 | A | * | 6/1941 | Schultz | 403/217 |
| 2,670,022 | A | * | 2/1954 | Oldberg et al. | 411/168 |
| 3,897,713 | A | * | 8/1975 | Gugle | 411/389 |
| 4,673,323 | A | * | 6/1987 | Russo | 411/107 |
| 4,968,202 | A | * | 11/1990 | Lanham | 411/431 |
| 5,071,301 | A | * | 12/1991 | Engelhardt et al. | 411/389 |
| 5,531,553 | A | * | 7/1996 | Bickford | 411/389 |
| 5,613,968 | A | * | 3/1997 | Lin | 411/389 |
| 5,672,178 | A | * | 9/1997 | Petersen | 606/75 |
| 5,732,513 | A | * | 3/1998 | Alley | 411/432 |
| 5,761,983 | A | * | 6/1998 | Gotoh et al. | 411/386 |
| 5,868,535 | A | * | 2/1999 | Ladouceur | 411/181 |
| 5,971,334 | A | * | 10/1999 | Crawshaw et al. | 411/383 |
| D422,202 | S | * | 4/2000 | Maki | D8/387 |
| 6,102,642 | A | * | 8/2000 | Kawashita et al. | 411/401 |
| 6,224,596 | B1 | * | 5/2001 | Jackson | 411/5 |
| 6,318,028 | B2 | * | 11/2001 | Alley | 411/432 |
| 6,443,681 | B1 | * | 9/2002 | Thonnes | 411/410 |
| D465,148 | S | * | 11/2002 | Monson | D8/387 |

(Continued)

*Primary Examiner* — Gay Spahn
(74) *Attorney, Agent, or Firm* — LambentIP

(57) ABSTRACT

A round top set screw is provided, including a first section having a shape of substantially a cylinder having a threaded side surface, a second section for wrenching drive, the second section formed contiguously and concentrically to the first section and having a shape of substantially a polygonal prism, and a third section formed contiguously and concentrically to the second section, the third section having a cylindrical portion and a round top having a convex shape, the edge of which contiguously connects to a side surface of the cylindrical portion, wherein the curvature of the convex shape is predetermined to prevent damages to a metal plate when it is pressed at an angle against the third section of the screw. A tool is provided for attaching the screw to a base board and securing it by using a corresponding nut. An apparatus including the screws for flattening a metal plate is also provided.

3 Claims, 5 Drawing Sheets

(56) References Cited

U.S. PATENT DOCUMENTS

| | | | |
|---|---|---|---|
| 6,592,313 B2 * | 7/2003 | Kohori | 411/402 |
| 6,699,248 B2 * | 3/2004 | Jackson | 411/3 |
| 6,729,244 B2 * | 5/2004 | Cattaneo | 411/107 |
| 6,782,597 B1 * | 8/2004 | Monson | 29/456 |
| 6,811,365 B2 * | 11/2004 | Monson | 411/395 |
| 6,872,041 B2 * | 3/2005 | Lohr | 411/378 |
| 6,918,727 B2 * | 7/2005 | Huang | 411/389 |
| 6,923,824 B2 * | 8/2005 | Morgan et al. | 606/232 |
| 6,959,627 B2 * | 11/2005 | Doran | 81/121.1 |
| 7,335,201 B2 * | 2/2008 | Doubler et al. | 606/264 |
| 7,438,513 B2 * | 10/2008 | Craven et al. | 411/402 |
| 7,645,106 B2 * | 1/2010 | Gordon | 411/393 |
| 7,713,013 B2 * | 5/2010 | Sedgwick et al. | 411/411 |
| 8,429,875 B2 * | 4/2013 | Bartlett | 52/741.1 |
| 8,702,362 B2 * | 4/2014 | Zhu | 411/166 |
| 2001/0028835 A1 * | 10/2001 | Oesterle et al. | 411/402 |
| 2001/0028836 A1 * | 10/2001 | Kohori | 411/402 |
| 2006/0291978 A1 * | 12/2006 | Panasik et al. | 411/378 |
| 2007/0031209 A1 * | 2/2007 | Craven et al. | 411/402 |
| 2007/0286703 A1 * | 12/2007 | Doubler et al. | 411/433 |
| 2008/0226422 A1 * | 9/2008 | Gordon | 411/393 |
| 2010/0239386 A1 * | 9/2010 | Sedgwick et al. | 411/402 |

* cited by examiner

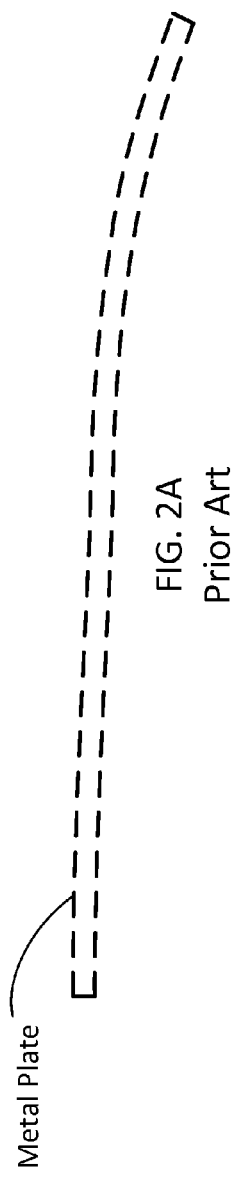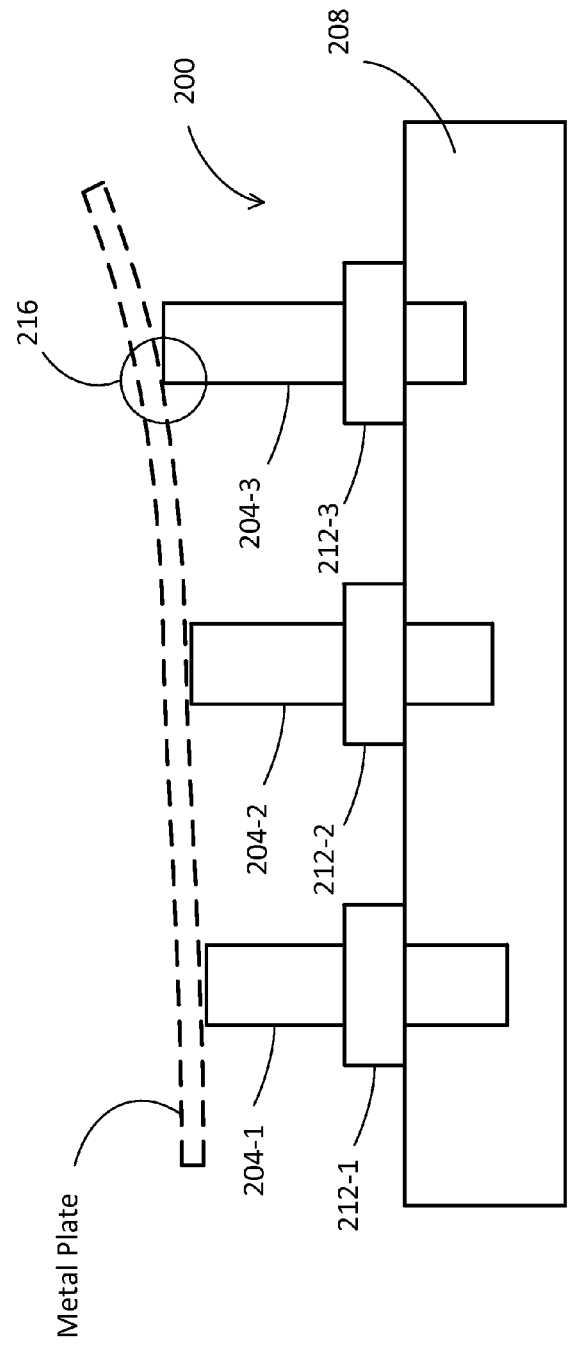

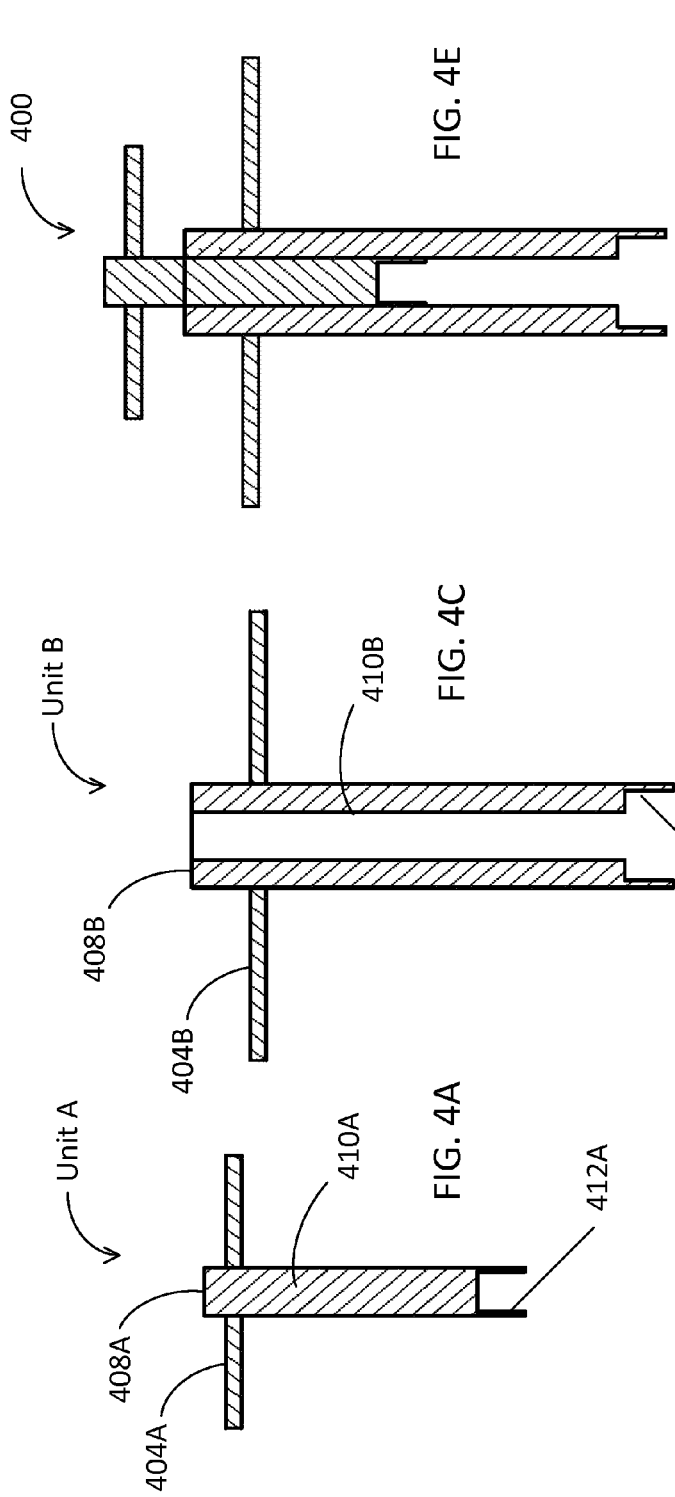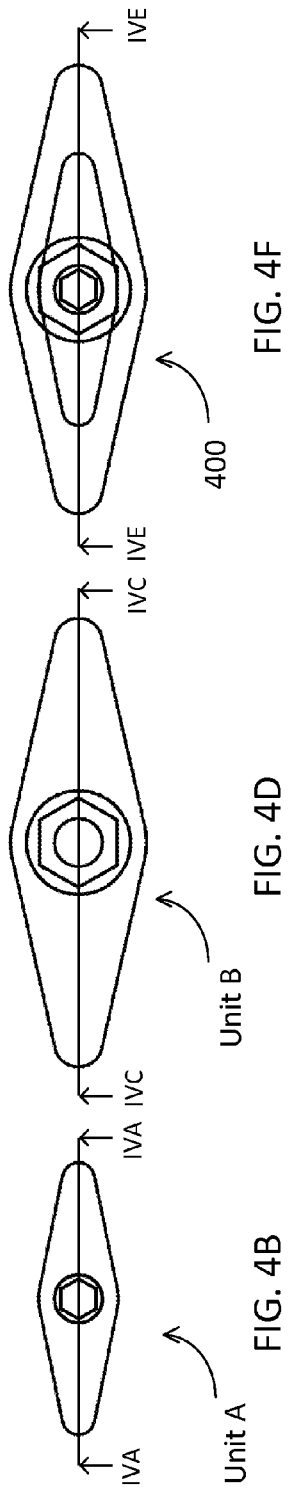

ROUND TOP SET SCREW AND
APPLICATION THEREOF

BACKGROUND

A set screw is generally used to secure two parts together by screwing through one part tightly upon or into another part to prevent relative movement. A typical set screw is fully threaded and driven with an internal-wrenching drive such as a socket having a cross-sectional shape of a hexagon, a star, a square, a slot, a cross, etc. These screws are generally made of alloy or stainless steel and used for a wide variety of applications, for example, for securing parts in rotating items such as door knobs, pulleys or wheels.

BRIEF DESCRIPTION OF THE DRAWINGS

FIGS. 4A-4F illustrate details of a wrenching tool for attaching a round top set screw and a nut to a base board.

FIGS. 5A-5C illustrate an example of a process of using the tool for attaching a round top set screw to a base board and securing it by using a corresponding nut.

DETAILED DESCRIPTION

Figure 1:
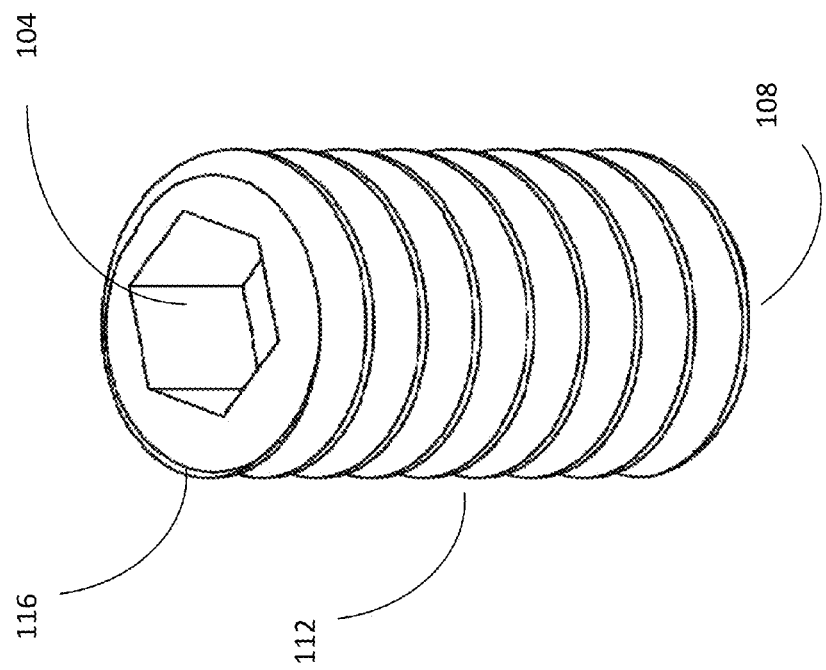
FIG. 1 illustrates an example of a conventional set screw.

FIG. 1 illustrates an example of a conventional set screw. This specific example is a hex socket set screw, which is provided with a socket 104 at one end portion of the screw, the socket having a horizontal cross-sectional shape of a hexagon for wrenching drive. The horizontal cross-sectional shape can be of a star, a square, a rectangle, a slot, a cross, etc., and a corresponding wrench or a screw driver is used for screwing. The other end portion 108 of the screw, often referred to as a point, can be designed to be flat, cup shaped, cone shaped, dome shaped, etc. The present example has a flat point and a side surface 112 that is fully threaded. The top surface of the set screw, where there is an opening of the socket 104 and the thread formation ends, is generally flat, hence forming a sharp edge 116.

Figure 2:
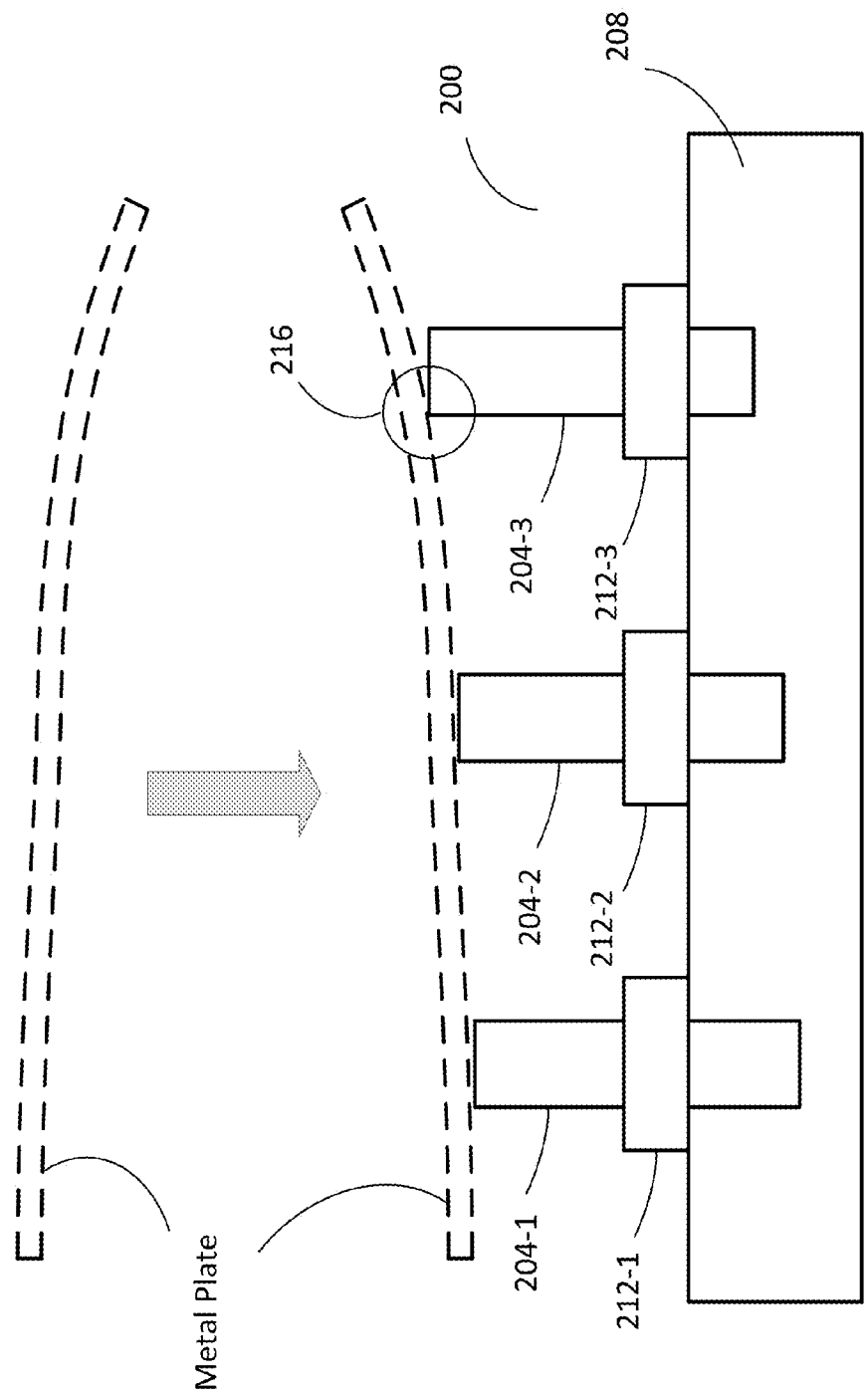
FIG. 2A illustrates a conventional metal plate and FIG. 2B illustrates an example of an application of set screws using the conventional metal plate.
Figure 2A:
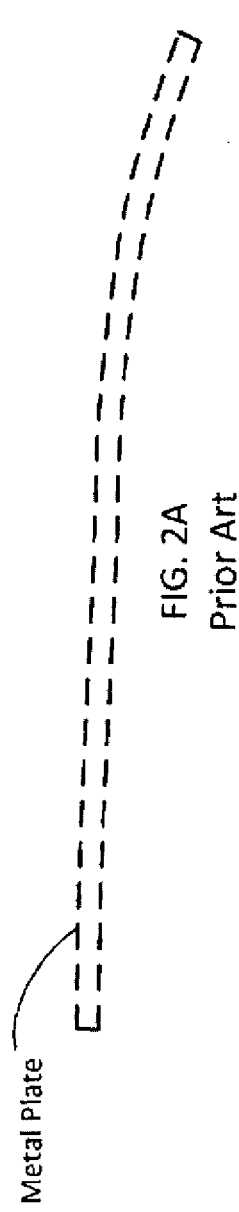
Figure 2B:
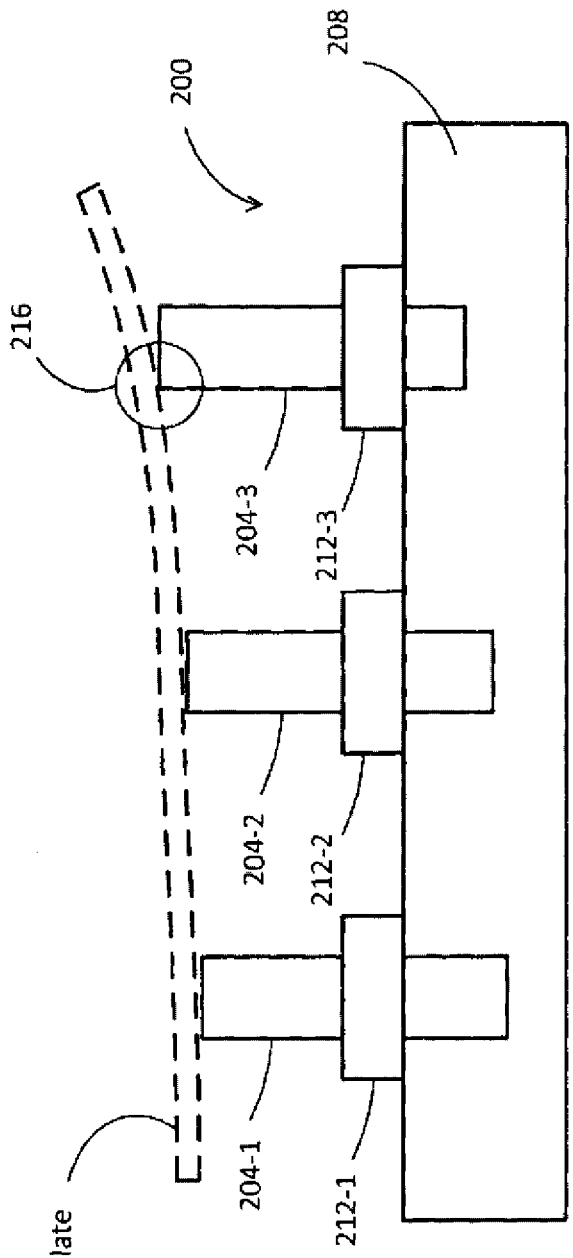

FIG. 2A illustrates a conventional metal plate and FIG. 2B illustrates an example of an application of set screws. An array of multiple set screws is used to form an apparatus 200 for flattening a metal plate. The number of set screws used for this purpose may be on the order of 10-100 or more, depending on the size and warpage of the metal plate and the required flatness tolerance (for example, within 0.05 mm). The apparatus 200 includes three set screws 204-1, 204-2 and 204-3 and a base board 208 in this example. Each set screw is screwed into the base board 208 by a specific length: the screw 204-1 is screwed in by a largest length; the screw 204-3 is screwed in by a smallest length; and the screw 204-2 is screwed in by an intermediate length. Each screw can be screwed down and up by engaging a wrench or a screw driver with the socket formed at the top end portion of the screw until it reaches a predetermined height above the base board. Thereafter, the screw can be secured to the base board 208 at the desired position using a fastener, such as a nut, a clip, a ring, etc. In this example of FIG. 2B, the three set screws 204-1, 204-2 and 204-3 are coupled with three fasteners 212-1, 212-2 and 212-3, respectively. Therefore, the height of each screw with respect to the top surface of the base board 208 can be adjusted by unlocking the fastener, vertically positioning the screw and re-tightening the fastener.

The height of each screw can be predetermined depending on the warpage of the metal plate to be flattened. As schematically illustrated in FIGS. 2A and 2B, the metal plate is originally warped downward with gradually increasing degree toward the right direction in this example. The heights of the three screws 204-1, 204-2 and 204-3 can be predetermined or adjusted so that, when the metal plate is pressed against the screws, the metal plate gets warped upward with gradually increasing degree toward the right direction. As a result of the compression exerting opposite to the original warpage, the flatness of the metal plate within a required tolerance can be achieved by the spring back action when the metal plate is removed from the apparatus 200.

Conventional set screws, such as shown in FIG. 1, may be used to construct the apparatus 200 for flattening a metal plate. However, the top end portion of a set screw generally has a sharp edge, such as the edge 116 of the example illustrated in FIG. 1. Therefore, when a warped metal plate is pressed against a conventional set screw, it is likely that the sharp edge of the screw touches the metal plate, for example, as indicated at a location 216, thereby generating dents, scars, scratches, or other damages on the surface of the metal plate.

In view of the above problems associated with using conventional set screws for an apparatus for flattening a metal plate, the present document describes a new type of set screw that can minimize damages to a metal plate when the metal plate is pressed against an array of the set screws having different heights in the apparatus for flattening the metal plate. Details of the new type of set screw and applications thereof according to present embodiments are explained below with reference to the subsequent drawings.

Figure 3E:
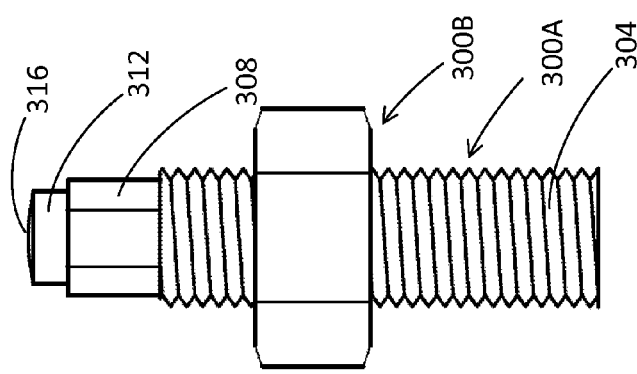
FIG. 3E and FIG. 3F are a top plan view and an elevational view, respectively, of a combination of the round top set screw and the nut.
Figure 3F:
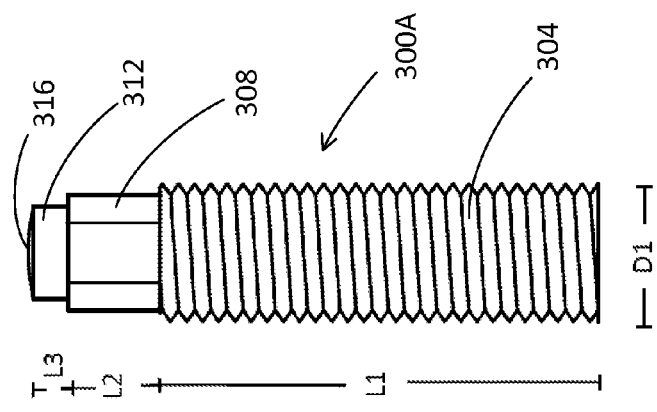
Figure 3C:
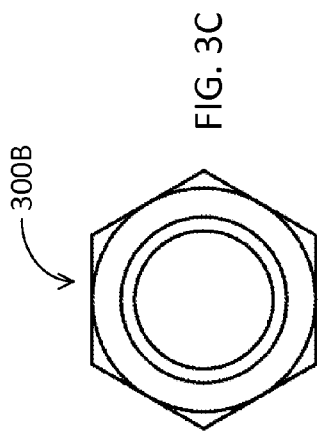
FIG. 3C and FIG. 3D are a top plan view and an elevational view, respectively, of an example of a nut to be engaged with the screw.
Figure 3D:
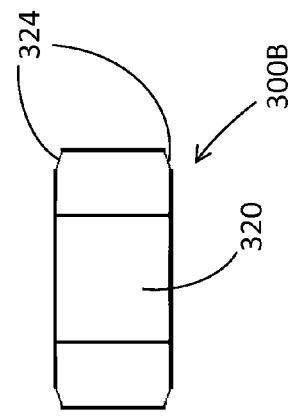
Figure 3A:
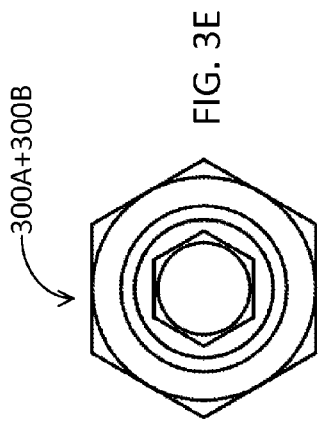
FIG. 3A and FIG. 3B are a too plan view and an elevational view, respectively, of an example of a round top set screw according to an embodiment.
Figure 3B:
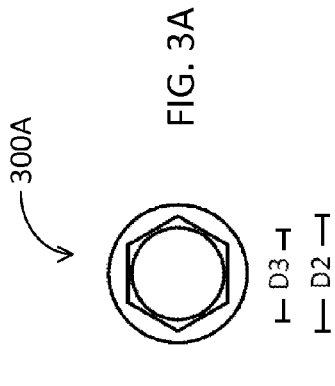
Figure 1:
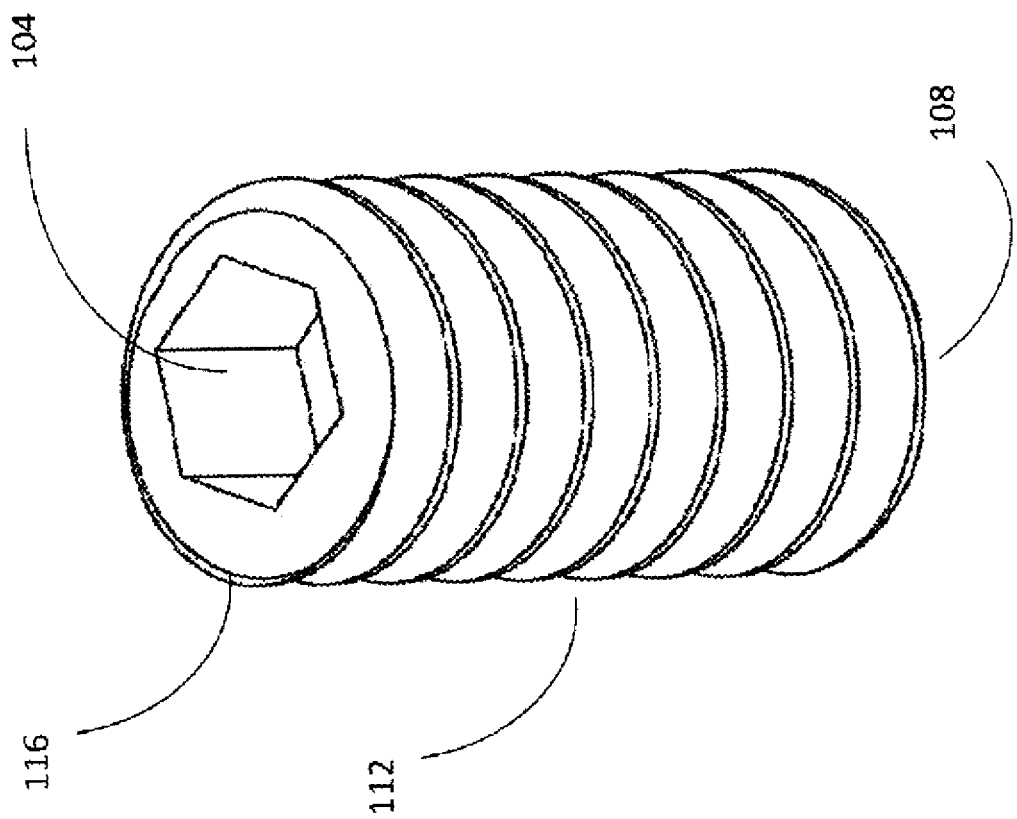

FIGS. 3A and 3B illustrate an example of a round top set screw 300A according to an embodiment. The top view and the side view are illustrated. The screw 300A has three sections 304, 308 and 312 formed contiguously and concentrically. The first section 304 is a main body that has a shape of substantially a cylinder with a diameter D1 and a length L1 that can be predetermined depending on the intended use and application. The side surface of the first section 304 is threaded. The second section 308 is a neck portion configured for wrenching drive. In this example, the shape of the second section 308 is substantially a hexagonal prism. That is, the horizontal cross-sectional shape of the second section 308 is a hexagon with a diagonal D2; however, a shape of a star, a square, a rectangle or other polygon can be used to form a corresponding polygonal prism for the second section 308. The shape and dimensions of the second section 308, such as the hexagonal diagonal D2 and the length L2, can be predetermined depending on the wrenching efficiency and other factors. The diagonal D2 of the second section 308 in this example is shown to be smaller than D1; however, it can be made larger than D1 when a greater torque for wrenching is needed, for example. The third section 312 is a head portion having a cylindrical portion and a round top 316. The round top 316 has a convex shape, the edge of which contiguously connects to the side surface of the cylindrical portion of the third section 312. The cylindrical portion has a diameter D3 and a length L3. The curvature of the convex can be predetermined so as to prevent damages to the metal plate when pressed at an angle against the third section 312, i.e., the head portion of the screw. The dimensions D3 and/or L3 can also be varied so as to optimize the tip strength while preventing the damages to the metal plate. For example, L3 can be made as small as possible, such as nearly zero, to minimize the protrusion of the third section 312 from the second section 308.

FIGS. 3C and 3D an example of a nut 300B to be engaged with the screw 300A of FIGS. 3A and 3B. This specific example is a conventional nut having a horizontal cross-sectional shape of a hexagon. The top view and the side view are illustrated. A thread 320 is internally formed (not visible in FIG. 3D), and the pitch of the thread 320 of the nut 300B is configured to correspond to the pitch of the thread of the main body 304 of the screw 300A for engaging. This particular nut 300B illustrated in FIGS. 3C and D is chamfered at the corners 324 to reduce deformation and/or crushing of the nut by the wrenching action. It is also possible to use an unchamfered nut.

FIGS. 3E and 3F illustrate combination of the round top set screw 300A and the nut 300B. These two parts are engaged with each other through the threads. The individual parts may be prepared to be combinations beforehand, so that the paired parts are already together without losing each other. Additionally, the screw and the corresponding nut can be tightened and locked to each other, and the combination of locked parts can be used as one integrated part for certain applications.

Referring back to FIG. 2B, the conventional set screws are used to construct the apparatus for flattening a metal plate, where the metal plate is often damaged due to the sharp edge 116 at the top end portion of the conventional set screw illustrated in FIG. 1, when the warped metal plate is pressed against the conventional set screw at an angle, such as indicated at the location 216. In a place of the conventional set screws, the round top set screws, as illustrated in FIGS. 3A and 3B, can be used to construct the apparatus. Due to the round top 316 formed in the third section 312 of the set screw 300A in FIGS. 3A and 3B, the metal plate is prevented from touching a sharp edge even when pressed against the screw at an angle. Therefore, it is possible to prevent damages to the metal plate during the pressing operation by using the round top set screws having different heights.

FIGS. 4A-4F illustrate details of a wrenching tool for attaching a round top set screw and a nut to a base board. This tool can be used, for example, for attaching each of the round top set screws to the base board and securing it by using the corresponding nut, so as to construct the apparatus for flattening a metal plate. This tool comprises two units: one unit A configured to act on a round top set screw; and the other unit B configured to act on a nut. FIGS. 4A and 4B and FIGS. 4C and 4D illustrate the units A and B, respectively. FIGS. 4E and 4F illustrate the tool when the units A and B are combined by coupling vertically and concentrically to each other. In FIGS. 4A-4F, the top views and the cross-sectional side views with respect to the vertical cut through the lines IVA-IVA, IVC-IVC, and IVE-IVE, respectively, are illustrated.

The unit A illustrated in FIGS. 4A and 4B includes a handle 404A and a cylinder 408A. The handle 404A is horizontally fixed to the top end portion of the cylinder 408A. As such, the cylinder 408A can be rotated around the cylindrical axis by turning the handle 404A with a hand or another tool. The center of the handle 404A is configured to coincide with the cylindrical axis of the cylinder 408A, in this example. However, only one arm or an asymmetric attachment of the handle 404A is also possible. The cylinder 408A has two sections. The first section 410A forms a solid cylinder. The second section has a hollow therein, hence having an internal side surface 412A, which is formed concentric with the outer side surface of the cylinder 408A. The horizontal cross section of the internal side surface 412A is hexagonal in shape in this example. The shape and dimensions of the internal side surface 412A can be predetermined or adjusted such that the second section of a round top set screw can be engaged for effective wrenching. Specifically, with reference to FIGS. 3A and 3B, the second section 308 of the round top set screw 300A can be engaged with the internal side surface 412A of the unit A for the wrenching purpose. The horizontal cross section of the internal side surface 412A may not be limited to a hexagon, but a rectangle or other shape may be used as long as the engagement with the screw 300A can be made effectively for wrenching.

The unit B illustrated in FIGS. 4C and 4D includes a handle 404B and a hollow cylinder 408B. The handle 404B is horizontally fixed to the top end portion of the hollow cylinder 408B. As such, the hollow cylinder 4088 can be rotated around the cylindrical axis by turning the handle 404B with a hand or another tool. The center of the handle 404B is configured to coincide with the cylindrical axis of the hollow cylinder 408B, in this example. However, only one arm or an asymmetric attachment of the handle 404B is also possible. The hollow cylinder 408B has two sections having two different internal side surfaces 410B and 412B, respectively. The first internal side surface 410B is formed cylindrical and concentric with the outer side surface of the hollow cylinder 408B. The second internal side surface 412B is formed concentric with the outer side surface of the hollow cylinder 408B, and the horizontal cross section of the second internal side surface 412B is hexagonal in shape in this example. The shape and dimensions of the second internal side surface 412B can be predetermined or adjusted such that a nut can be engaged for effective wrenching. Specifically, with reference to FIGS. 3C and 3D, the nut 300B can be engaged with the internal side surface 412B of the unit B for the wrenching purpose. The horizontal cross section of the internal side surface 412B may not be limited to a hexagon, but a rectangle or other shape may be used as long as the engagement with the nut 300B can be made effectively for wrenching.

The tool 400 illustrated in FIGS. 4E and 4F is a combination of the unit A and the unit B, which are coupled concentrically to each other to be used to act on a combination of a nut and a round top set screw. The diameter of the cylinder 408A of the unit A can be made smaller than the diameter of the horizontal cross section of the first internal side surface 410B of the unit B so that the cylinder 408A can be inserted smoothly into the hollow cylinder 408B.

FIGS. 5A-5C illustrate an example of a process of using the tool 400 for attaching a round top set screw to a base board and securing it by using a corresponding nut. Initially, a round top set screw and a corresponding nut may be tightened and locked to each other through the threads to form a combination of the two. For example, the nut 300B as illustrated in FIGS. 3C and 3D may be locked to the round top set screw 300A as illustrated in FIGS. 3A and 3B, to form a combination as illustrated in FIGS. 3E and 3F. FIG. 5A illustrates a first step where the combination of the round top set screw 300A and the nut 300B is wrenched by engaging the nut 300B with the second internal side surface 412B of the unit B to screw in the round top set screw 300A to a certain depth in the base board 504. FIG. 5B illustrates a second step where the unit A is inserted into the unit B vertically and coupled concentrically with the unit B so that the unit A can act on the screw 300A, while the unit B acts on the nut 300B. In this configuration, the round top set screw 300A and the nut 300B can be unlocked from each other by wrenching the two parts with the corresponding units, respectively, specifically by engaging the nut 300B with the second internal side surface 412B of the unit B and engaging the second section 308 of the screw 300A with the internal side surface 412A of the unit A. Thereafter, the height of the round top set screw 300A may be adjusted to have a predetermined height by wrenching by engaging the second section 308 of the screw 300A with the internal side surface 412A of the unit A. Once the predetermined height is reached, the nut 300B may be wrenched by engaging the nut 300B with the second internal side surface 412B of the unit B, while engaging the second section 308 of the screw 300A with the internal side surface 412A of the unit A, to lock itself to the round top set screw 300A and secure the screw 300A to the base board 504, in a third step as illustrated in FIG. 5C. Thereafter, the units A and B may be removed.

Figure 6C:
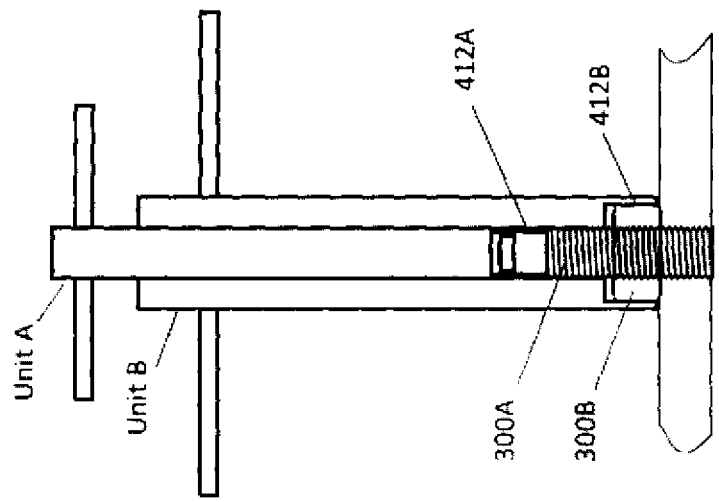
FIGS. 6A-6C illustrate another example of a process of using the tool for attaching a round top set screw to a base board and securing it by using a corresponding nut.
Figure 6B:
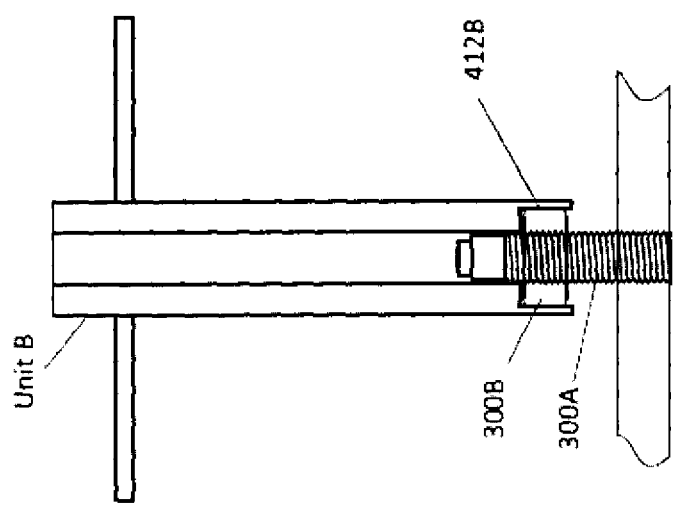
Figure 6A:
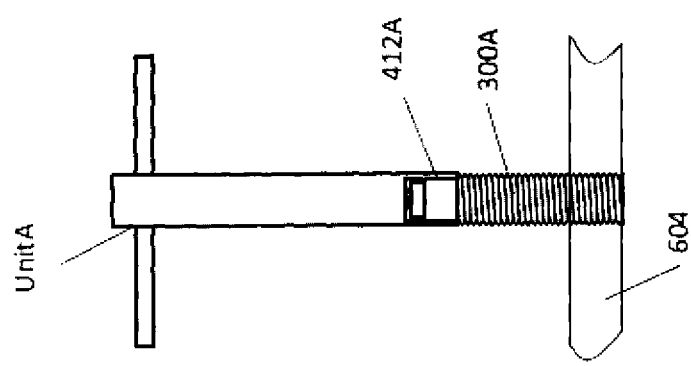

FIGS. 6A-6C illustrate another example of a process of using the tool 400 for attaching a round top set screw to a base board and securing it by using a corresponding nut. Initially, a round top set screw and a corresponding nut may be separated. FIG. 6A illustrates a first step where the round top set screw 300A is wrenched by engaging the second section 308 of the screw 300A with the internal side surface 412A of the unit A to screw in the round top set screw 300A to a certain depth in the base board 604. FIG. 6B illustrates a second step where the unit A is removed, and the unit B is used to couple the nut 300B with the screw 300A through the threads. For this operation, the outer side surface of the nut 300B may be engaged with the second internal side surface 412B of the unit B. FIG. 6C illustrates a third step where the unit A is inserted into the unit B vertically and coupled concentrically with the unit B so that the unit A can act on the screw 300A, while the unit B acts on the nut 300B. Thereafter, the height of the round top set screw 300A may be adjusted to have a predetermined height by wrenching by engaging the second section 308 of the screw 300A with the internal side surface 412A of the unit A. Once the predetermined height is reached, the nut 300B may be wrenched by engaging the nut 300B with the second internal side surface 412B of the unit B, while engaging the second section 308 of the screw 300A with the internal side surface 412A of the unit A, to lock itself to the round top set screw 300A and secure the screw 300A to the base board 604. Thereafter, the units A and B may be removed.

While this document contains many specifics, these should not be construed as limitations on the scope of an invention or of what may be claimed, but rather as descriptions of features specific to particular embodiments of the invention. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be exercised from the combination, and the claimed combination may be directed to a subcombination or a variation of a subcombination.

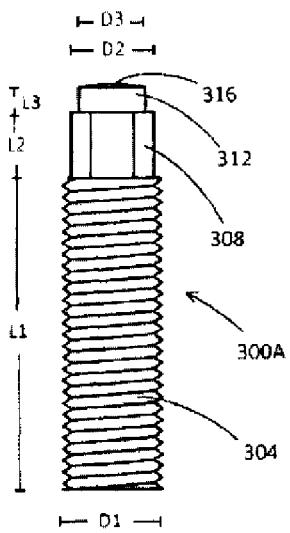

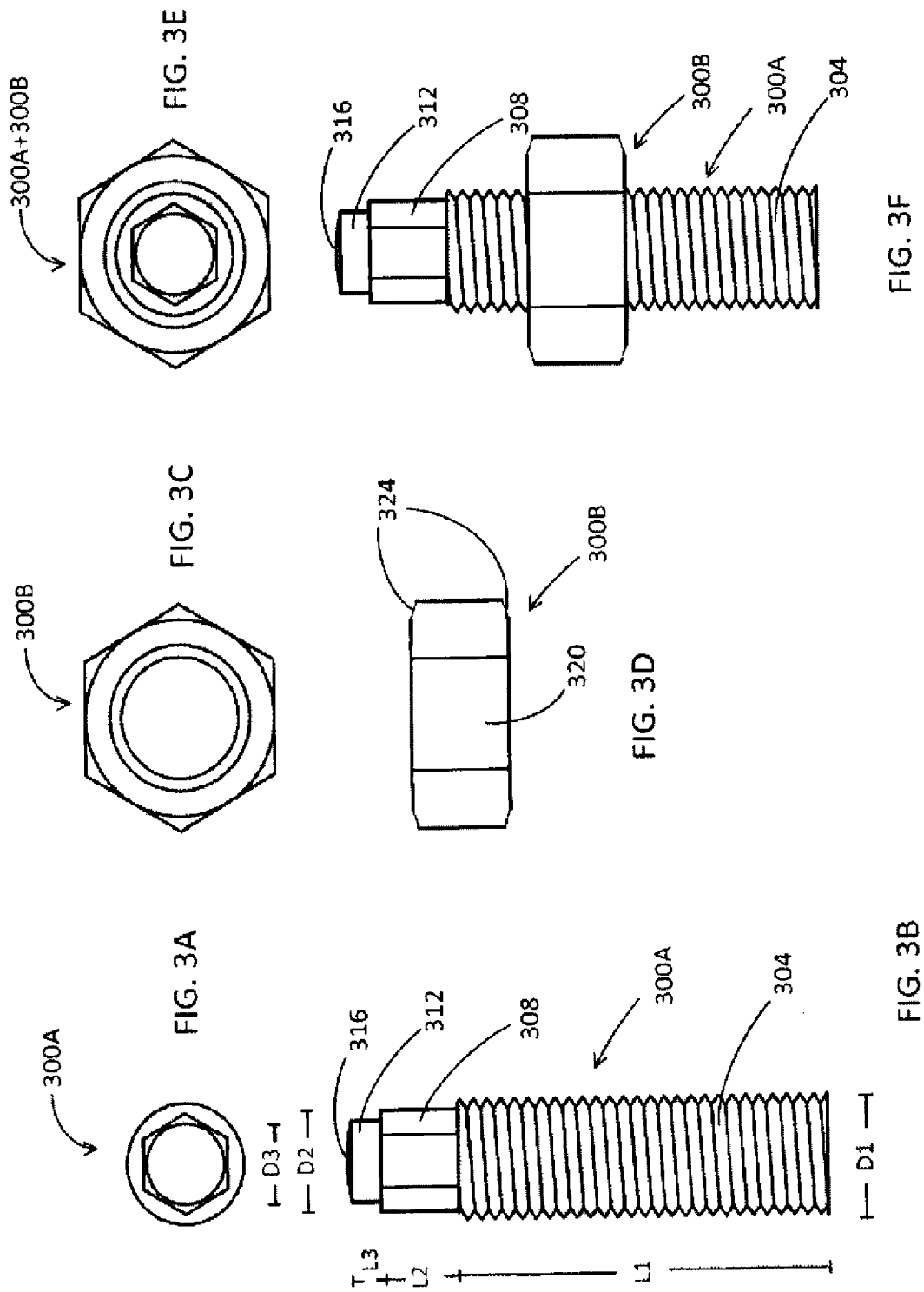

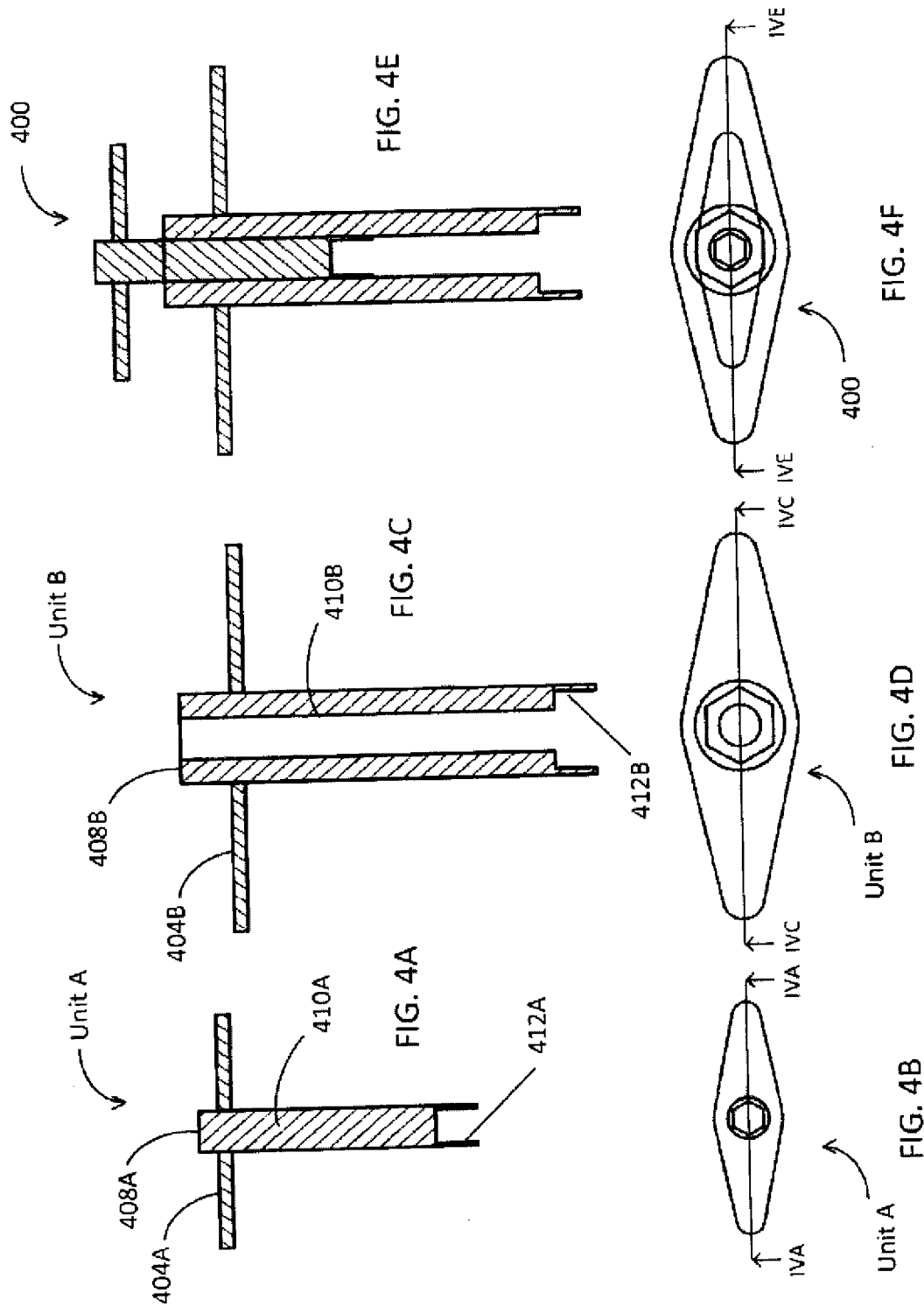

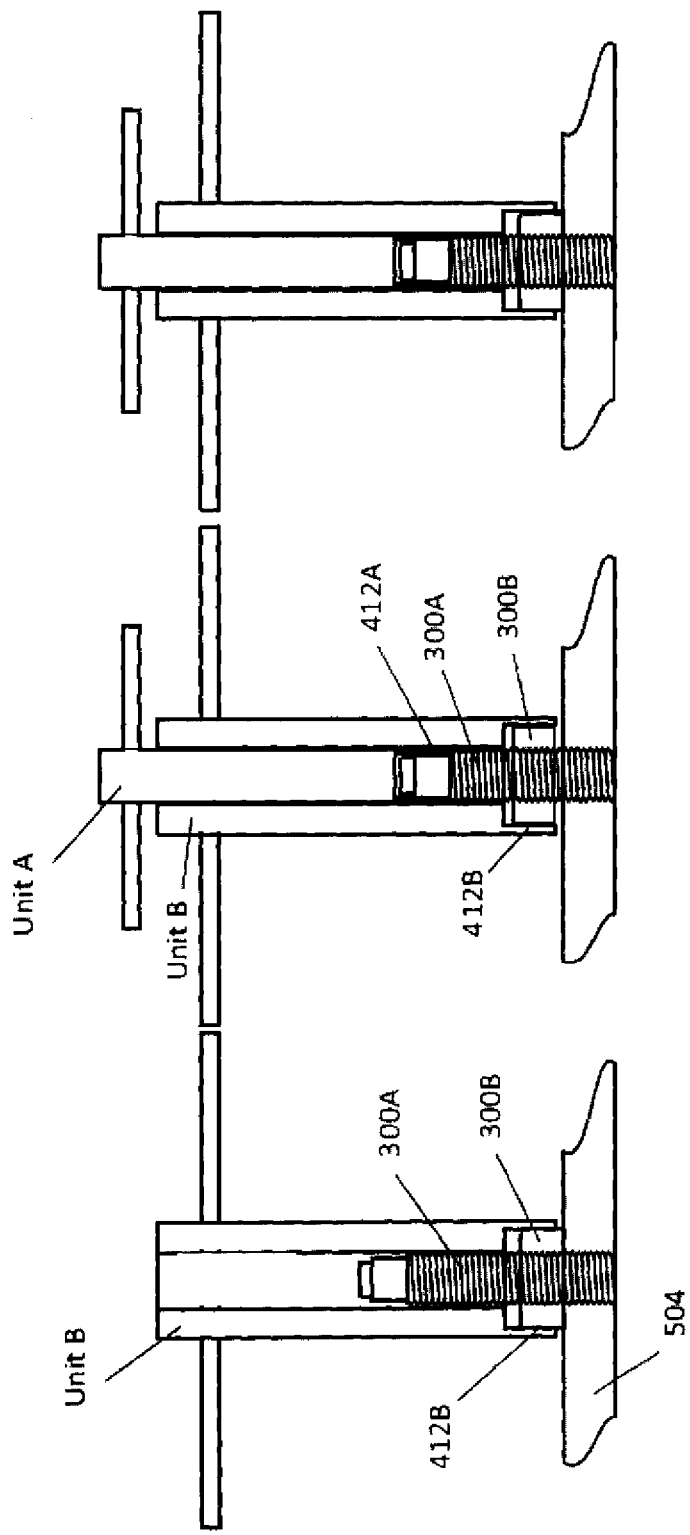

What is claimed is:
1. A screw comprising:
a first section having a shape of substantially a cylinder having a threaded side surface, at least part of which is for use for engagement with a nut;
a second section for wrenching drive, the second section formed contiguously and concentrically to the first section and having a shape of substantially a polygonal prism; and
a third section formed contiguously and concentrically to the second section, the third section having a cylindrical portion and a round top having a convex shape, the edge of which contiguously connects to a side surface of the cylindrical portion,
wherein a diagonal of a horizontal cross-sectional shape of the polygonal prism is larger than a diameter of the cylindrical portion, and a diameter of the first section is larger than the diagonal of the horizontal cross-sectional shape of the polygonal prism.
2. The screw of claim 1, wherein
a curvature of the convex shape is predetermined to prevent damages to a metal plate when it is pressed at an angle against the third section of the screw.
3. The screw of claim 1, wherein
the polygonal prism is a hexagonal prism.

\* \* \* \* \*

UNITED STATES PATENT AND TRADEMARK OFFICE
CERTIFICATE OF CORRECTION

PATENT NO.        : 8,794,891 B1
APPLICATION NO.   : 13/941648
DATED             : August 5, 2014
INVENTOR(S)       : Hirofumi Saito Page 1 of 8

It is certified that error appears in the above-identified patent and that said Letters Patent is hereby corrected as shown below:

Delete the title page and substitute therefore with the attached title page consisting of the corrected number of Drawing Sheets in Patent.

In the Drawings

Delete Drawing Sheets 1-5 and substitute therefore with the attached Drawing Sheets 1-6, Fig. 2 is deleted and Figs 5A-5C and Figs 6A-6C have been added.

Signed and Sealed this
Ninth Day of December, 2014

Michelle K. Lee
*Deputy Director of the United States Patent and Trademark Office*

(12) United States Patent
Saito

(10) Patent No.: US 8,794,891 B1
(45) Date of Patent: Aug. 5, 2014

(54) ROUND TOP SET SCREW AND APPLICATION THEREOF

(71) Applicant: Hirofumi Saito, Chula Vista, CA (US)

(72) Inventor: Hirofumi Saito, Chula Vista, CA (US)

(*) Notice: Subject to any disclaimer, the term of this patent is extended or adjusted under 35 U.S.C. 154(b) by 0 days.

(21) Appl. No.: 13/941,648

(22) Filed: Jul. 15, 2013

(51) Int. Cl.
- F16B 35/00 (2006.01)
- B21D 1/14 (2006.01)
- B25B 13/48 (2006.01)

(52) U.S. Cl.
CPC .............. F16B 35/005 (2013.01); B21D 1/14 (2013.01); B25B 13/48 (2013.01)
USPC .................................................. 411/393; 411/402

(58) Field of Classification Search
CPC ....................................... F16B 35/005; F16B 35/00
USPC ........................... 411/378, 393, 402, 919
See application file for complete search history.

(56) References Cited

U.S. PATENT DOCUMENTS

| | | | | |
|---|---|---|---|---|
| 172,459 A * | 1/1876 | Lewis | | 411/378 |
| 429,057 A * | 5/1890 | Peterson | | 248/62 |
| 446,741 A * | 2/1891 | Jones | | 411/393 |
| 448,347 A * | 3/1891 | Jones | | 411/393 |
| D31,894 S * | 11/1899 | Dixon | | D8/387 |
| 755,804 A * | 3/1904 | Smith | | 411/402 |
| 869,086 A * | 10/1907 | Hoffman | | 411/393 |
| 907,160 A * | 12/1908 | Molloy | | 411/393 |
| 1,762,410 A * | 6/1930 | Newpher | | 470/27 |
| 1,934,752 A * | 11/1933 | Wilcox | | 470/11 |
| 1,936,769 A * | 11/1933 | Olivet | | 16/381 |
| 2,076,041 A * | 4/1937 | Payne | | 411/410 |
| 2,153,702 A * | 4/1939 | Tighe | | 411/378 |
| 2,246,457 A * | 6/1941 | Schultz | | 403/217 |
| 2,670,022 A * | 2/1954 | Oldberg et al. | | 411/168 |
| 3,897,713 A * | 8/1975 | Gugle | | 411/389 |
| 4,673,323 A * | 6/1987 | Russo | | 411/107 |
| 4,968,202 A * | 11/1990 | Lanham | | 411/431 |
| 5,071,301 A * | 12/1991 | Engelhardt et al. | | 411/389 |
| 5,531,553 A * | 7/1996 | Bickford | | 411/389 |
| 5,613,968 A * | 3/1997 | Lin | | 411/389 |
| 5,672,178 A * | 9/1997 | Petersen | | 606/75 |
| 5,732,513 A * | 3/1998 | Alley | | 411/432 |
| 5,761,983 A * | 6/1998 | Gotoh et al. | | 411/386 |
| 5,868,535 A * | 2/1999 | Ladouceur | | 411/181 |
| 5,971,334 A * | 10/1999 | Crawshaw et al. | | 411/383 |
| D422,202 S * | 4/2000 | Maki | | D8/387 |
| 6,102,642 A * | 8/2000 | Kawashita et al. | | 411/402 |
| 6,224,596 B1 * | 5/2001 | Jackson | | 411/5 |
| 6,318,028 B2 * | 11/2001 | Alley | | 411/432 |
| 6,443,681 B1 * | 9/2002 | Thonnes | | 411/410 |
| D465,148 S * | 11/2002 | Monson | | D8/387 |

(Continued)

*Primary Examiner* — Gay Spahn
(74) *Attorney, Agent, or Firm* — LambentIP

(57) ABSTRACT

A round top set screw is provided, including a first section having a shape of substantially a cylinder having a threaded side surface, a second section for wrenching drive, the second section formed contiguously and concentrically to the first section and having a shape of substantially a polygonal prism, and a third section formed contiguously and concentrically to the second section, the third section having a cylindrical portion and a round top having a convex shape, the edge of which contiguously connects to a side surface of the cylindrical portion, wherein the curvature of the convex shape is predetermined to prevent damages to a metal plate when it is pressed at an angle against the third section of the screw. A tool is provided for attaching the screw to a base board and securing it by using a corresponding nut. An apparatus including the screws for flattening a metal plate is also provided.

3 Claims, 6 Drawing Sheets